United States Patent [19]

Isobe et al.

[11] Patent Number: 5,589,186
[45] Date of Patent: Dec. 31, 1996

[54] FEED COMPOSITION FOR RUMINANT ANIMALS AND METHOD OF FEEDING RUMINANT ANIMALS WITH THE SAME

[75] Inventors: Yoshio Isobe, Suginami-ku; Toshio Ito, Suita; Fumio Shibata, Fujisawa, all of Japan

[73] Assignee: Takeda Chemical Industries, Ltd., Osaka, Japan

[21] Appl. No.: 418,165

[22] Filed: Apr. 6, 1995

Related U.S. Application Data

[63] Continuation of Ser. No. 97,994, Jul. 29, 1993, abandoned.

[30] Foreign Application Priority Data

Jan. 29, 1993 [JP] Japan .................................. 5-034381

[51] Int. Cl.$^6$ ..................................................... A23K 1/18
[52] U.S. Cl. ........................... 424/438; 424/489; 426/807
[58] Field of Search ................................... 424/438, 489; 426/807

[56] References Cited

U.S. PATENT DOCUMENTS

| | | | |
|---|---|---|---|
| 4,491,599 | 1/1985 | Citterio | 426/331 |
| 4,948,589 | 8/1990 | Iijima | 424/438 |

FOREIGN PATENT DOCUMENTS

| | | |
|---|---|---|
| 56-121436 | 9/1981 | Japan . |
| 58-155050 | 9/1983 | Japan . |
| 63-152948 | 6/1988 | Japan . |

OTHER PUBLICATIONS

Shin–ichi Suzuki et al., "6. Application of fumaric acid as menas for improving milk quality", Journal of Japanese Veterinarians Association, vol. 39, (Supp'l Issue) (1985).

Masakazu Kobayashi et al., "Effect of Feeding Acidified Milk Replacer on Preweaning Holstein Bull Calves", Chiba Prefectural Livestock Center Report 13 (1989), pp. 119–121.

Takeshi Ito et al., "Effect of Acidified Milk Replacer on Preweaning & Postweaning Growth of Cross Bred Beef Calves", Chiba Prefectural Livestock Center Report 14 (1990), pp. 29–34.

Yoshio Isobe et al., "Aspects of Fermentation in the Rumen of Goats Administered with Fumaric Acid", 28–P–1 presented at the 86th Congress of Japanese Society of Zootechnical Science, 1992.

*Primary Examiner*—D. Gabrielle Phelan
*Attorney, Agent, or Firm*—Foley & Lardner

[57] ABSTRACT

A feed composition containing fumaric acid or a salt thereof, a concentrate feed and, if necessary, a roughage is fed to ruminants. The ratio of the concentrate to the roughage is about 90-10/10-90 (% by weight). When fumaric acid or a salt thereof in a granular form such as mean particle diameter of not less than 75 mesh is added to a ration, the proportion of acetic acid and propionic acid among volatile fatty acids (VFA) in the ruminant animal is increased for a sustained time to enhance the efficiency of milk and meat production and improve the quality of meat. The proportion of fumaric acid or a salt thereof is about 0.1 to 10% by weight. The addition of fumaric acid or a salt thereof helps to suppress flatulence which tends to occur on feeding with concentrates.

14 Claims, 1 Drawing Sheet

FEED COMPOSITION FOR RUMINANT ANIMALS AND METHOD OF FEEDING RUMINANT ANIMALS WITH THE SAME

This application is a continuation of application Ser. No. 08/097,994, filed Jul. 29, 1993, now abandoned.

FIELD OF THE INVENTION

The present invention relates to a feed composition for ruminant animals and a method of feeding ruminant animals with the feed composition.

BACKGROUND OF THE INVENTION

Incorporated in diets for domestic animals is a variety of additives. For example, it is described in Japanese Patent Laid open No. (JP-A) 58-155050 that the administration of hydroxycarboxylic or polybasic carboxylic acids such as citric acid, tartaric acid, fumaric acid, etc. or their salts to poultry results in improvements in egg production rate and egg quality. Moreover, Japanese Patent Laid open No. (JP-A) 56-121436 discloses a formula feed comprising a milk replacer supplemented with $C_{4-6}$ carboxylic acids or salts thereof for improved palatability and accelerated growth of calves.

Regarding acidic milk replacers for young calves, it has been reported that the use of an acidic milk replacer containing 0.2% of fumaric acid as added provides for free nursing, prevents diarrhea and improves growth in the fattening stage [Chiba Prefectural Livestock Center Report 13 (1989), pp. 119–121 and Chiba Prefectural Livestock Center Report 14 (1990), pp. 29–34.]

It has also been reported that supplementing a cattle ration with fumaric acid is effective in the prophylaxis and therapy of mastitis in cows [Journal Japanese Veterinarians Association 39 (Supplemental Issue) (1985)].

Meanwhile, roughages and concentrates have been used for ruminant animals having well-developed rumination systems, such as dairy and feeder cattle. Chemical decomposition of the feed taken into the rumen of such a ruminant animal occurs anaerobically in the presence of enzymes provided by both the animal and the bacterial and protozoan symbionts in its rumen and the carbohydrates metabolized by microorganisms within the rumen are finally converted to volatile fatty acids (VFA) such as acetic acid, propionic acid, butyric acid, etc., carbon dioxide and methane. The VFA mentioned above is absorbed chiefly from the rumen. Furthermore, in the rumen, the feed is partially decomposed and the microorganisms, their cell components and undecomposed feed components find their way into the abomasum and, thence, into the small intestine. In this small intestine the cell components are digested by secreted enzymes and the products of digestion are absorbed from the bowels. Moreover, said VFA maintains the gastric juice in the rumen normally at pH about 5.5 to 6.5.

When the absorption of acetic acid and propionic acid, among species of said VFA, is encouraged, the synthesis of fat in the body is enhanced that the milk secretions may have an increased milk fat percentage. Increased absorption of acetic acid encourages the increase of fat and, hence, improves the quality of meat and produces a high quality meat such as marbled beef. Therefore, in order to insure an increased milk production and a favorable body weight gain and further to improve the degree of marbling positively with good reproducibility, it is beneficial to supply lactating cows or feeders with a concentrate ration well-designed taking their nutrient requirements into consideration. Particularly for the cows having a high production history or those bred under unfavorable climatic conditions, in which deficiencies in milk protein and fat are apt to appear, it is advantageous to supply a concentrate to enhance the production of acetic acid and propionic acid among various species of VFA.

However, when a ruminant with a well-developed rumination system is supplied with large quantities of a concentrate, foaming in the rumen is invigorated to increase chances for frothy flatulence, or foamy bloat, and tend to make the pH of the rumen fluid unstable. Particularly the supply of a concentrate in large amounts lowers the proportion of acetic acid in the total VFA. Therefore, there is an inherent limit to enhancement of the efficiency of milk and meat production or of the quality of meat.

On the other hand, the supply of a formula feed rich in roughage and having a high cellulose results in the production of an assortment of acids in which acetic acid is predominant and, moreover, a low rate of cellulose digestion. Therefore, when a ration containing both a roughage and a concentrate is employed, the ruminant animal cannot utilize the feed effectively so that its milk or meat productivity is decreased.

Meanwhile, it is described in Japanese Patent Publication No. (JP-B) 3-31422 that the use of an acidic milk replacer containing an acid (e.g. fumaric acid) finely divided to 100 mesh pass as a supplement for young cattle and other young animals helped to prevent the agglutination and coagulation of milk protein.

However, feeding a ruminant having a well-developed rumination system with an acid finely divided to 100 mesh pass results in a rapid dissolution of the acid in the rumen and, moreover, detracts from the palatability of the ration. And the resultant decrease in food intake makes it difficult to enhance the efficiency of milk or meat production.

SUMMARY OF THE INVENTION

It is, therefore, an object of the present invention to provide a feed composition for ruminant animals and a method of feeding such animals, by which the proportion of acetic acid and propionic acid in the total VFA can be increased to enhance the efficiency of milk and meat production and, at the same time, the quality of meat can be improved.

It is another object of the present invention to provide a feed composition for ruminant animals and a method of feeding such animals, which are useful for production of a high quality milk and meat such as marbled beef.

A further object of the present invention is to provide a feed composition for ruminant animals and a method of feeding such animals, whereby an increased proportion of acetic acid and propionic acid in total VFA can be insured over a prolonged time.

A still further object of the present invention is to provide a feed composition for ruminant animals a method of feeding such animals, which can be utilized effectively by ruminant animals and enhances milk and meat production.

The inventors of the present invention found after much research that the above-mentioned objects can be successfully accomplished by feeding a ruminant animal with a feed composition prepared by adding fumaric acid or a salt thereof to a concentrate feed.

Thus, the feed composition of the present invention comprises a concentrate and fumaric acid or a salt thereof.

The concentrate contains cereals in many cases and may be a formula feed. Ruminant animals may be supplied with such a concentrate together with a roughage. The fumaric acid and salt thereof may be powdery or granular.

By the method of the present invention which comprises feeding a ruminant animal with the above feed composition, the proportion of acetic acid and propionic acid in the total VFA can be increased to thereby enhance the efficiency of milk and meat production, and the quality of meat can be improved to produce a high quality meat such as marbled beef. When a powdery or granular form of fumaric acid or a salt thereof is employed, the residence time of the fumaric acid or salt in the stomach is prolonged so that the proportion of acetic acid and propionic acid in the total VFA can be increased and maintained over a long time.

The feed composition of the present invention can be applied to ruminant animals including cattle, such as dairy cows, feeders, sec., and sheep such as goats and sheep. The invention is preferably supplied to ruminant animals bred for milk or meat production rather than young ruminant placed on a milk replacer.

DETAILED DESCRIPTION OF THE PREFERRED EMBODIMENT OF THE INVENTION

Figure 1:
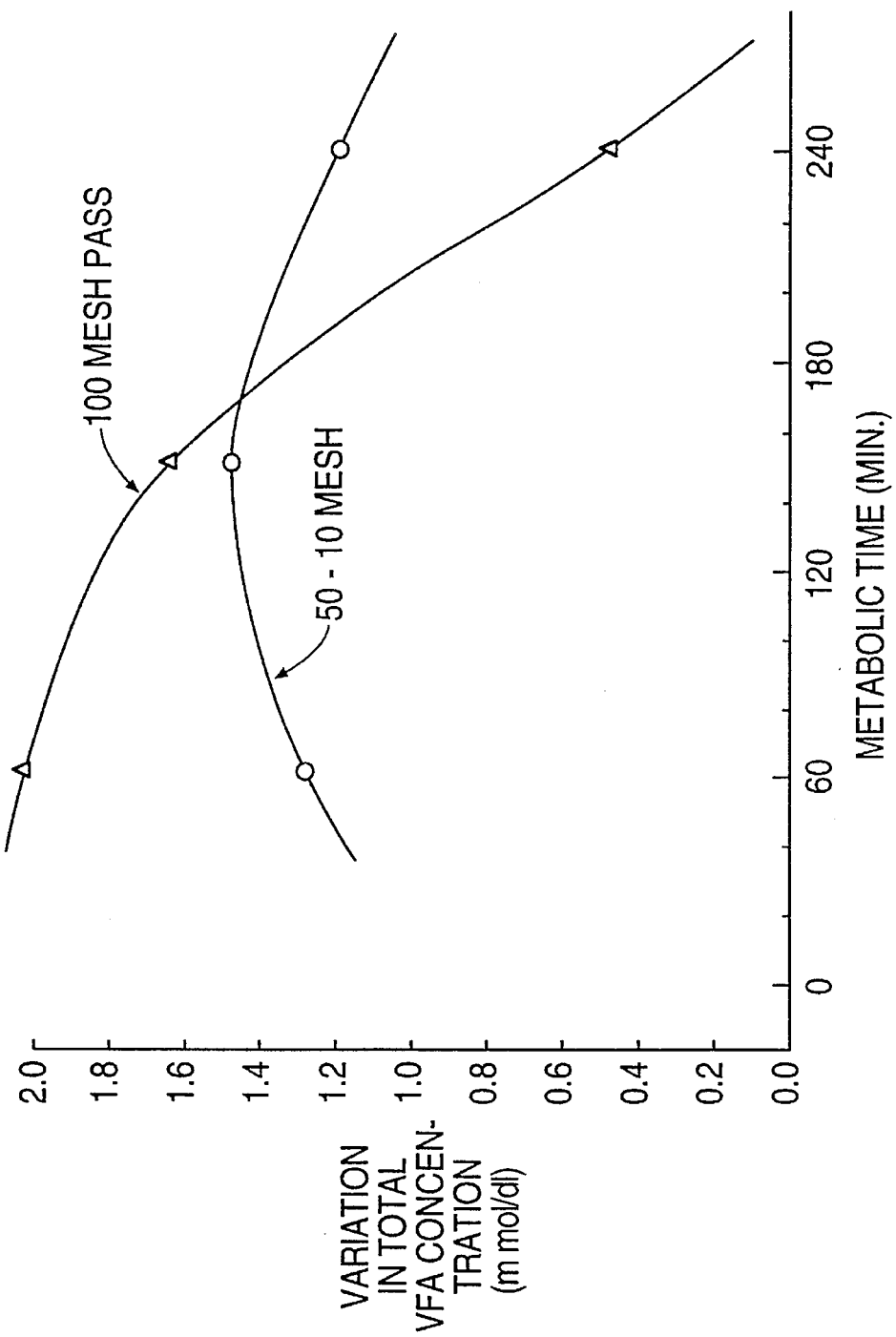
FIG. 1 is a graph showing the relationship between metabolic time and variation in total VFA concentration in Example 6.

The feed composition contains at least a concentrate. It should be understood that, since the concentrate is supplied to ruminant animals having a well-developed rumination system such as dairy and feeder cattle, the concentrate is distinguished from an acidic milk replacer which is supplied to young ruminant animals such as young calves. When the ruminant animals are meat-producing ruminants such as feeder cattle, the concentrate may be supplied for several months (e.g. three months) before forwarding (shipping).

The concentrate feed can be comprised of the conventional components, mainly cereal grains. The concentrate components thus include, for example, cereals such as corn, milo, wheat, barley, rye, oat, wheat flour, unpolished rice, millet, soybean, soybean flour, cassava, etc., oil meals such as soybean meal, dehulled soybean meal, rapeseed oil meal, peanut oil meal, linseed oil meal, sesame oil meal, coconut oil meal, sunflower oil meal, safflower oil meal, palm kernel oil meal, kapok oil meal, etc.; feeds of animal origin such as fish meal, fish solubles, meat scrap, mead-and-bone meal, blood meal, feather meal, silkworm cocoon oil meal, skimmed milk, whey, animal oils (e.g. beef oil, lard oil, bone oil, etc.), brewers' yeast, torula yeast, etc.; mineral feeds such as sodium chloride, calcium sources (e.g. calcium carbonate, limestone powder, oyster shell, etc.) and phosphorus sources (e.g. dicalcium phosphate, tricalcium phosphate, etc.); vitamins, amino acids and minerals.

The concentrate, if necessary, may contain a variety of additives such as an antibiotic, preservative, enzyme, antifungal agent, antioxidant, colorant, sweetener, perfume, binder and so on.

In the concentrate, cereals are contained generally in a proportion of about 30 to 80% by weight and preferably about 40 to 80% by weight. While the concentrate may be a mixed feed, it is more frequently a formula feed. The application form of such a formula feed is not critical, and can be liberally selected from among such solid forms as the mash, pellets, crumbles, cubes and flakes. The quantitative formulation varies according to species of ruminant livestock and the information contained in the Japan Feeding Standards (Central Association of Livestock Producers, 1987) is incorporated herein by reference.

The concentrate is frequently given with a roughage. The roughage is primarily composed of cellulosic materials such as plant stems and leaves, e.g. alfalfa meal, timothy hay, introduced grass, native grass, green roughage, straw, tree leaves, etc., brans such as rice bran, barley bran, wheat bran, etc. and crude fibers (e.g. factory byproducts such as gluten food, gluten meal, starch meal, molasses, soy sauce byproducts, brewery's byproducts, beat pulp, bagasse, soybean curd cake, malt sprouts, mandarin orange peels, mandarin orange juice cake, etc.

The concentrate-roughage ratio can be selected from a broad range, and is usually about 90-10/10-90 (% by weight) and preferably about 70-20/30-80 (% by weight). If the proportion of the concentrate is too large, foamy bloat, or frothy flatulence, will tend to occur more frequently. If said proportion is too small, the fiber digestion rate will be decreased. These problems are overcome when fumaric acid or a salt thereof is added.

The feed composition of the present invention is characterized in that it contains fumaric acid or a salt thereof in addition to said concentrate. Fumaric acid may be used as it is or in the form of a salt. The salt of fumaric acid includes, for example, salts with alkali metals, e.g. potassium, sodium, etc., alkaline earth metals, e.g. calcium, barium, magnesium, etc., and ammonium. The salt formed by one of the carboxyl groups of fumaric acid is also included. Furthermore, fumaric acid and any of such salts can be used in combination.

The addition of fumaric acid or a salt thereof brings forth the following effects.

(1) An increased proportion of the concentrate in the feed composition tends to cause a decreased proportion of acetic acid and propionic acid among VFA species. On the other hand, the addition of fumaric acid or a salt thereof increases this proportion of acetic acid and propionic acid and decreases the proportion of butyric acid, isobutyric acid, etc. in the total VFA. This effect leads to the production of protein and/or fat-rich milk by dairy ruminants and the production of prime quality meat such as marbled beef through an increased proportion of fat in the muscles of meat-producing ruminants.

(2) Since the digestion of fibers in the stomach, particularly in the rumen, of ruminants is promoted, a high feed efficiency can be maintained even when a roughage is added. Therefore, coupled with the effect mentioned in (1), the milk and meat productivity of ruminants can be enhanced.

(3) The addition of fumaric acid or a salt thereof results in an increased population of microorganisms in the rumen and, hence, an enhanced level of ammoniacal nitrogen. On the other hand, the microorganisms in the rumen are gradually transported to the abomasum to the small intestine where they are digested, and the protein of digested microorganisms is a high-quality precursor protein for the biosynthesis of milk protein. Therefore, the efficiency of milk and meat production is increased and the quality of meat is also improved.

(4) The use of a concentrate in an excessively large proportion tends to cause foamy bloating but the addition of fumaric acid or a salt thereof helps to inhibit frothing of the rumen fluid. Therefore a larger amount of the concentrate can be supplied to dairy ruminants in the high-lactation stage and, moreover, even meat-producing ruminants can be supplied with the concentrate without inducing adverse effects.

(5) When fumaric acid or a salt thereof is added, its acid taste promotes the secretion of saliva at ingestion and this saliva exerts a buffer effect on the pH in the stomach of ruminants to prevent its depression and stabilize it. This tendency is particularly remarkable when the proportion of the concentrate in the feed is great.

Fumaric acid or a salt thereof can be used in whichever of the liquid and the powdery or granular form but is preferably used in the powdery or granular form and more advantageously in the granular form in order to insure a sustained production of VFA in which acetic acid and propionic acid predominate. To prolong the residence time in the stomach of ruminants, the mean particle diameter of such granular fumaric acid or salt is not less than about 75 mesh (namely, which corresponds to a mean particle diameter of not passing through a sieve of about 75 mesh, i.e. not less than about 190 μm), preferably about 70 to 10 mesh and more preferably about 50 to 10 mesh. It suffices that the fumaric acid or salt has a mean diameter within the above range and may include finer and coarser particles which may unavoidably be included. The proportion of such unavoidably included particles is generally not greater than, for example, 20% by weight.

The optimal amount of fumaric acid or a salt thereof varies considerably according to the final form of the feed composition and whether a roughage is included or not. Generally speaking, in the final ration to be ingested by ruminants, fumaric acid or a salt thereof is contained in a proportion of about 0.1 to 10% by weight, preferably about 0.5 to 7.5% by weight, and more preferably about 1 to 5% by weight. If the proportion of fumaric acid or a salt thereof is less than 0.1% by weight, the contemplated effect will not be sufficient, and said proportion is more than 10% by weight, the palatability of the diet will be sacrificed.

When the feed composition comprises both a roughage and a concentrate in admixture, the proportion of fumaric acid or a salt thereof can be selected to satisfy the above-mentioned range according to the roughage-concentrate ratio. When the concentrate is a mixed feed or a solid formula feed, the amount of fumaric acid or a salt thereof in the concentrate is usually in the range of about 0.2 to 20% by weight, preferably about 1 to 15% by weight and more preferably about 2 to 10% by weight.

The feed composition of the present invention can be manufactured by the conventional technology. Thus, a mixed feed or a formula feed can be manufactured by blending the feed components mentioned hereinbefore with fumaric acid or a salt thereof. A solid formula feed can be manufactured by blending said feed components with fumaric acid or a salt thereof and molding the mixture into any of the forms described hereinbefore. In the case of a solid formula feed, fumaric acid or a salt thereof can be incorporated, in granular form, by the conventional granulation technique.

In accordance with the feeding method of the invention, ruminant animals can be put on a feed composition containing at least a concentrate and fumaric acid or a salt thereof. The concentrate is supplied to animals frequently in combination with a roughage in the above-mentioned ratio.

The daily supply amount of fumaric acid or a salt thereof can be selected with reference to the species and body weight of ruminant animal. Taking cattle weighing 600 kg as an example, said amount is about 12 to 1800 g/day, preferably about 60 to 1200 g/day and more preferably about 120 to 600 g/day. This amount of fumaric acid or a salt thereof can be given together with said feed in several installments daily and, taking a twice-a-day feeding schedule as an example, the amount per feeding is about 60 to 300 g.

The following examples and comparative examples are intended to describe the present invention in further detail and should by no means be construed as limiting the scope of the invention.

EXAMPLES

Comparative Example 1 and Examples 1 and 2

To 900 parts by weight of a ration consisting of 20% by weight of a concentrate (180 parts by weight of crushed corn) and 80% by weight of a roughage (600 parts by weight of timothy hay and 120 parts by weight of beat pulp) was added a varying proportion, viz. 0% (Comparative Example 1), 2.5% by weight (Example 1) and 5% by weight (Example 2), of fumaric acid (manufactured by Takeda Chemical Industries, Ltd.; 48 mesh on).

These feed compositions were given to 3 goats, each fitted with the rumen cannula, by the automatic feeding method in 4 rations of 225 g each at 6-hour intervals daily for 3 consecutive weeks. In the last week, the rumen contents were taken at 6-hour intervals, immediately before feeding, and the VFA composition (mole ratios), ammoniacal nitrogen concentration and pH were determined. The froth in the rumen fluid was also evaluated.

Comparative Example 2 and Examples 3 and 4

To 900 parts by weight of a ration consisting of 50% by weight of a concentrate (450 parts by weight of crushed corn) and 50% by weight of a roughage (380 pares by weight of timothy hay and 70 parts by weight of beat pulp) was added a varying proportion, viz. 0% (Comparative Example 2), 2.5% by weight (Example 3) and 5% by weight (Example 4), of fumaric acid (manufactured by Takeda Chemical Industries, Ltd.; 48 mesh on).

In the same manner as Comparative Example 1 and Examples 1 and 2, these feed compositions were given to 3 goats each fitted with the rumen cannula and the VFA composition (mole ratios), ammoniacal nitrogen concentration and pH of rumen contents were determined. The amount of froth in the rumen fluid was also evaluated.

The results of the above Comparative Examples and Examples are see forth hereunder. The measured values were subjected to statistical significance test and the mean +− standard deviation values were tabulated.

(1) VFA composition (mole ratios)

The proportions of VFA species are shown in Table 1.

TABLE 1

| | Feed composition | | Rumen VFA Compoisition | | | | | | |
|---|---|---|---|---|---|---|---|---|---|
| | Concentrate/ Roughage (% by weight) | Amount of fumaric acid (% by weight) | (mol ratio, mean +− standard deviation values) | | | | | | |
| | | | Acetic acid | Propionic acid | Isobutyric acid | Butyric acid | Isovaleri acid | Valeric acid | Caproic acid |
| Comparative Example 1 | 20/80 | 0 | 62.4 +− 0.93 | 17.5 +− 0.78 | 5.3 +− 0.66 | 10.4 +− 0.54 | 2.6 +− 0.41 | 1.1 +− 0.23 | 0.8 +− 0.15 |
| Example 1 | 20/80 | 2.5 | 64.0 +− 0.07 | 19.6 +− 0.69 | 4.9 +− 0.69 | 8.8 +− 0.47 | 1.9 +− 0.26 | 0.6 +− 0.06 | 0.2 +− 0.03 |
| Example 2 | 20/80 | 5.0 | 66.9 +− 0.59 | 21.0 +− 0.27 | 2.8 +− 0.42 | 6.8 +− 0.31 | 1.9 +− 0.51 | 0.5 +− 0.10 | 0.2 +− 0.06 |
| Comparative Example 2 | 50/50 | 0 | 53.2 +− 0.58 | 19.5 +− 0.41 | 11.3 +− 0.44 | 10.7 +− 0.39 | 2.9 +− 0.27 | 1.2 +− 0.30 | 1.1 +− 0.26 |
| Example 3 | 50/50 | 2.5 | 54.6 +− 0.79 | 21.8 +− 0.47 | 7.5 +− 0.42 | 10.6 +− 0.35 | 2.9 +− 0.20 | 1.5 +− 0.40 | 1.0 +− 0.17 |
| Example 4 | 50/50 | 5.0 | 58.8 +− 0.65 | 22.1 +− 0.43 | 3.1 +− 0.25 | 12.4 +− 0.30 | 2.1 +− 0.12 | 0.7 +− 0.03 | 0.8 +− 0.07 |

It is apparent from Table 1 that, referring to Examples 1 through 4, the increased level of fumaric acid resulted in an increased proportion of acetic acid and propionic acid and a decreased proportion of isobutyric acid. It is also clear that in Examples 1 and 2 where the roughage content of the feed compositions was high, the proportions of butyric acid, valeric acid and caproic acid produced were also decreased.

These results suggest that allowing dairy cows put on a concentrate feed and hence liable to yield a low-fat milk (less than the standard milk fat level of 3.5%) to ingest such a fumaric acid-containing feed composition results in an increased absorption of acetic acid and propionic acid, and hence, in the production of milk with a high milk fat percentage. Moreover, in the case of feeder cattle given a concentrate in large quantities, the absorption of acetic acid can be enhanced to improve the quality of beef.

(2) Ammoniacal nitrogen level

The ammoniacal nitrogen concentration data are shown in Table 2.

TABLE 2

| | Ammoniacal nitrogen concentration (mg/dl, mean +− standard deviation values) |
|---|---|
| Comparative Example 1 | 7.30 +− 1.22 |
| Example 1 | 7.57 +− 0.69 |
| Example 2 | 9.01 +− 0.57 |
| Comparative Example 2 | 8.76 +− 1.39 |
| Example 3 | 14.63 +− 0.01 |
| Example 4 | 17.82 +− 0.79 |

Compared with Comparative Examples 1 and 2, the ammoniacal nitrogen level was significantly elevated in accordance with the level of addition of fumaric acid in Examples 1 through 4 and especially in Examples 3 and 4 where the concentrate was used in a high proportion. Since the ammonia in the rumen is mostly produced by microorganisms, these increases in ammonia concentration are indicative of an increased proliferation of microorganisms. The microbial protein available on digestion in the course of transport from the rumen to the abomasum to the small intestine is a high-quality precursor protein for the biosynthesis of milk protein and is utilized effectively in the production of milk.

(3) pH

The pH values of rumen contents are shown in the following Table 3.

TABLE 3

| | pH (mean +− standard deviation values) |
|---|---|
| Comparative Example 1 | 6.38 +− 0.07 |
| Example 1 | 6.40 +− 0.04 |
| Example 2 | 6.50 +− 0.10 |
| Comparative Example 2 | 6.33 +− 0.04 |
| Example 3 | 6.39 +− 0.01 |
| Example 4 | 6.52 +− 0.08 |

It is apparent from Table 3 that in Examples 1 to 4 as compared with Comparative Examples 1 and 2, the rumen pH was invariably increased with an increasing proportion of fumaric acid added despite the fact that fumaric acid is acidic. Particularly in Examples 3 and 4 where the concentrate was used in a large proportion, the pH increases were statistically significant. This is probably because the acid taste of fumaric acid promotes the secretion of saliva at ingestion and the buffer action of the saliva prevents elevation of pH and stabilizes it. (4) Foaming The degree of foaming in rumen contents was assessed visually. The rumen fluid contained fine bubbles in Comparative Example 2 where: the proportion of the concentrate was larger than in Comparative Example 1. In the experiments where fumaric acid-containing feed compositions were used and even in Examples 3 and 4 where the proportion of the concentrate was high, the amount of froth in the rumen fluid was smaller and the amount of froth in Example 4 where fumaric acid was added at the level of 5% by weight was almost negligible.

Meanwhile, a sudden switchover from a concentrate-lean ration to a concentrate-rich ration tends to encourage foaming due to derangement of homeostasis in the rumen. Therefore, a ration with a concentrate/roughage ratio of 20/80 (% by weight) was first given and a ration with a concentrate/roughage ratio of 30/70 (% by weight) and a ration with a concentrate/roughage ratio of 40/60 (% by weight) were serially given within a certain period of time. Then, within 1 week, the animals were put on a ration with a concentrate/roughage ratio of 50/50 (% by weight). However, in the experiments where fumaric acid was not added, the results were more or less the same as those found in Comparative Examples 1 and 2.

Example 5

The feed compositions of Comparative Examples 1 and 2 and those of Examples 1 to 4 were given in the same manner as above and 50 ml of the rumen fluid was recovered into a conical beaker (capacity 100 ml) in a constant-temperature water bath at 39° C. Then, carbon dioxide gas was bubbled through the fluid from the bottom of the breaker to investigate the degree of foaming. The results are shown in Table 4. The degree of foaming was assessed according to the following criteria.

poor: Bubbles do not collapse in the gas phase in the beaker but grow to fill up the breaker and overflow.
good: Bubbles are formed but collapse in the gas phase.
excellent: Bubbles are not formed.

TABLE 4

|  | Degree of foaming in rumen contents |
| --- | --- |
| Comparative Example 1 | Good |
| Example 1 | Excellent |
| Example 2 | Excellent |
| Comparative Example 2 | Poor |
| Example 3 | Excellent |
| Example 4 | Excellent |

It is apparent from Table 4 that when the feed compositions contained a roughage in large quantities (Comparative Example 1, Examples 1 and 2), no froth formation was observed. As regards the feed compositions with high proportions of a concentrate, whereas the bubbles overflew the beaker in the case of the fumaric acid-free composition (Comparative Example 2), some bubbles formed but collapsed in the gas phase within the beaker in the case of the feed composition containing 2.5% by weight of fumaric acid (Example 3) and no froth was observed in the case of the feed composition containing 5% by weight of fumaric acid (Example 4).

Therefore, when fumaric acid is added to a ration, bloating can be suppressed or inhibited even without administering an antifoam as a symptomatic treatment. Moreover, a concentrate feed can be safely given in large quantities to dairy ruminants such as dairy cows in the high lactation stage and as to meat-producing ruminants such as feeder cattle, which are generally put on a concentrate-rich ration, they can be successfully fattened without the risk of flatulence.

Example 6

The feed composition of Examples was given as described above and 200 ml of the rumen fluid was recovered immediately before feeding and cultured anaerobically in vitro. To each 100 ml of the culture containing total VFA of 5 m mol/dl was added 232 mg (2 mM) of fumaric acid of 100 mesh pass and fumaric acid of 50-10 mesh and the subsequent VFA outputs were determined. The results are shown in FIG. 1.

It is apparent from FIG. 1 that the added fumaric acid of 100 mesh pass dissolved in a short period of time to cause an early production of VFA and the time of its metabolism was about 150 minutes. In contrast, when fumaric acid of 50-10 mesh was added, the fumaric acid dissolved gradually in the rumen with a gradual production of VFA and the metabolism of fumaric acid was sustained for about 240 minutes or more.

What is claimed is:
1. A feed composition for ruminant animals which comprises
    (a) 0.1 to 10 parts by weight of fumaric acid in a powdery or granular form having a mean particle diameter of not less than 75 mesh and
    (b) 100 parts by weight of a ration comprising
        (i) 90 to 10% by weight of a concentrate feed containing 30 to 80% by weight of cereals based on the total weight of the concentrated feed and
        (ii) 10 to 90% by weight of roughage,
    wherein said concentrate feed comprises at least one member selected from the group consisting of oil meals, feeds of animal origin, mineral feeds, vitamins, amino acids, and minerals, and
    wherein said roughage comprises at least one member selected from the group consisting of plant stems, plant leaves, brans, and factory byproducts.

2. A feed composition for ruminant animals which comprises
    (a) 0.5 to 7.5 parts by weight of fumaric acid in a powdery or granular form having a mean particle diameter of not less than 75 mesh and
    (b) 100 parts by weight of a ration comprising
        (i) 70 to 20% by weight of a concentrate feed containing 40 to 80% by weight of cereals based on the total weight of the concentrated feed, and
        (ii) 30 to 80% by weight of roughage,
    wherein said concentrate feed comprises at least one member selected form the group consisting of oil meals, feeds of animal origin, mineral feeds, vitamins, amino, acids and minerals, and
    wherein said roughage comprises at least one member selected from the group consisting of plant stems, plant leaves, brans, and factory byproducts.

3. A method of treating or preventing frothy flatulence in a ruminant animal which comprises feeding a ruminant animal with a feed composition comprising
    (a) 0.1 to 10 parts by weight of fumaric acid in a powdery or granular form having a mean particle diameter of not less than 75 mesh and
    (b) 100 parts by weight of a ration comprising
        (i) 90 to 10% by weight of a concentrate feed containing 30 to 80% by weight of cereals based on the total weight of the concentrated feed, and
        (ii) 10 to 90% by weight of roughage,
    wherein said concentrate feed comprises at least one member selected from the group consisting of oil meals, feeds of animal origin, mineral feeds, vitamins, amino acids, and minerals, and
    wherein said roughage comprises at least one member selected from the group consisting of plant stems, plant leaves, brans, and factory byproducts.

4. A feed composition according to claim 1, wherein the concentrate feed is a formulated compound feed.

5. A feed composition according to claim 1, wherein the fumaric acid is in a granular form.

6. A feed composition according to claim 1, wherein the fumaric acid is in granular form having a mean particle size diameter of 10 to 70 mesh.

7. A method of feeding a ruminant animal, which comprises feeding a ruminant animal with a composition as claimed in claim 1.

8. A method of feeding according to claim 7, which comprises supplying 12 to 1800 grams per day of the fumaric acid based on a cattle weighing 600 kg.

9. A method of feeding according to claim 7, which comprises supplying 60 to 300 grams of fumaric acid per feeding.

10. A method of feeding according to claim 7, wherein the ruminant animals are dairy or feeder cattle.

11. A feed composition according to claim 1, which comprises about 0.1 to 10% by weight of fumaric acid.

12. A feed composition according to claim 1, which comprises about 0.5 to 7.5% by weight of fumaric acid.

13. A feed composition according to claim 1, which comprises about 1 to 5% by weight of fumaric acid.

14. A feed composition according to claim 4, wherein 0.2 to 10% by weight of fumaric acid is contained in the formulated compound feed.

* * * * *